(12) United States Patent (10) Patent No.: US 9,201,934 B2
Zelevinsky (45) Date of Patent: Dec. 1, 2015

(54) INTERACTIVE DATA MINING

(71) Applicant: ORACLE INTERNATIONAL CORPORATION, Redwoodshores, CA (US)

(72) Inventor: Vladimir Zelevinsky, Sharon, MA (US)

(73) Assignee: Oracle International Corporation, Redwood Shores, CA (US)

( * ) Notice: Subject to any disclaimer, the term of this patent is extended or adjusted under 35 U.S.C. 154(b) by 197 days.

(21) Appl. No.: 13/906,540

(22) Filed: May 31, 2013

(65) Prior Publication Data

US 2014/0095542 A1 Apr. 3, 2014

Related U.S. Application Data

(60) Provisional application No. 61/708,698, filed on Oct. 2, 2012.

(51) Int. Cl.
*G06F 17/30* (2006.01)

(52) U.S. Cl.
CPC .... *G06F 17/30539* (2013.01); *G06F 17/30572* (2013.01)

(58) Field of Classification Search
USPC .......................... 707/999.002; 705/227, 764; 709/204–206
See application file for complete search history.

(56) References Cited

U.S. PATENT DOCUMENTS

| 6,282,532 | B1 | 8/2001 | Sandell |
| 7,035,864 | B1 | 4/2006 | Ferrari et al. |
| 7,647,293 | B2 * | 1/2010 | Brown et al. .......... 707/999.002 |
| 7,979,362 | B2 | 7/2011 | Zhao et al. |
| 2005/0240615 | A1 * | 10/2005 | Barsness et al. .............. 707/102 |
| 2008/0295007 | A1 * | 11/2008 | Bernhardt ..................... 715/764 |
| 2009/0300544 | A1 * | 12/2009 | Psenka et al. ................. 715/810 |
| 2013/0117654 | A1 * | 5/2013 | Rosner .......................... 715/227 |
| 2013/0265319 | A1 * | 10/2013 | Fisher et al. .................. 345/589 |

* cited by examiner

*Primary Examiner* — Etienne Leroux
(74) *Attorney, Agent, or Firm* — Miles & Stockbridge P.C.

(57) ABSTRACT

A data mining system receives a data set that includes a plurality of columns of data. The system determines correlations between columns of data of the data set and displays an interactive listing of a plurality of pairs of columns based on the correlations. The listing includes preview information based on the correlations for each pair. The system receives a selection of a value from the interactive listing from a user and refines the data set in response to the selection.

20 Claims, 3 Drawing Sheets

INTERACTIVE DATA MINING

CROSS REFERENCE TO RELATED APPLICATIONS

This application claims priority of Provisional Patent Application Ser. No. 61/708,698, filed on Oct. 2, 2012, the contents of which is hereby incorporated by reference.

FIELD

One embodiment is directed generally to a computer system, and in particular to a computer system that performs data mining.

BACKGROUND INFORMATION

Data mining in general is the computational process of discovering patterns in large data sets and can involve the fields of artificial intelligence, machine learning, statistics, and database systems. The typical goal of data mining is to extract information from a data set and transform it into an understandable structure for further use. Data mining tasks include the automatic or semi-automatic analysis of large quantities of data to extract previously unknown interesting patterns such as groups of data records (i.e., cluster analysis), unusual records (i.e., anomaly detection) and dependencies (i.e., association rule mining).

However, known data mining techniques typically require careful model-building and deep initial insight into data. The subsequent steps may include writing custom code and running complex computations, and an end result is produced that is frequently either obvious or wrong. At best, data mining typically requires expert input and guidance, and returns results that only experts can understand and analyze.

SUMMARY

One embodiment is a data mining system that receives a data set that includes a plurality of columns of data. The system determines correlations between columns of data of the data set and displays an interactive listing of a plurality of pairs of columns based on the correlations. The listing includes preview information based on the correlations for each pair. The system receives a selection of a value from the interactive listing from a user and refines the data set in response to the selection.

DETAILED DESCRIPTION

One embodiment receives a set of numerical column data and/or label column data. The system determines all pairwise column correlations, or if a user identifies a column of interest, the system determines the correlation between the column of interest and all other columns. The correlations may also be determined using a subset of all columns. The correlations of interest to the user, such as relatively high correlation and anti-correlation values from the pairwise correlation, or columns highly correlated or anti-correlated to the column of interest, are then displayed to the user. The user can then interactively select a value from one of the columns and refine the data set.

Figure 1:
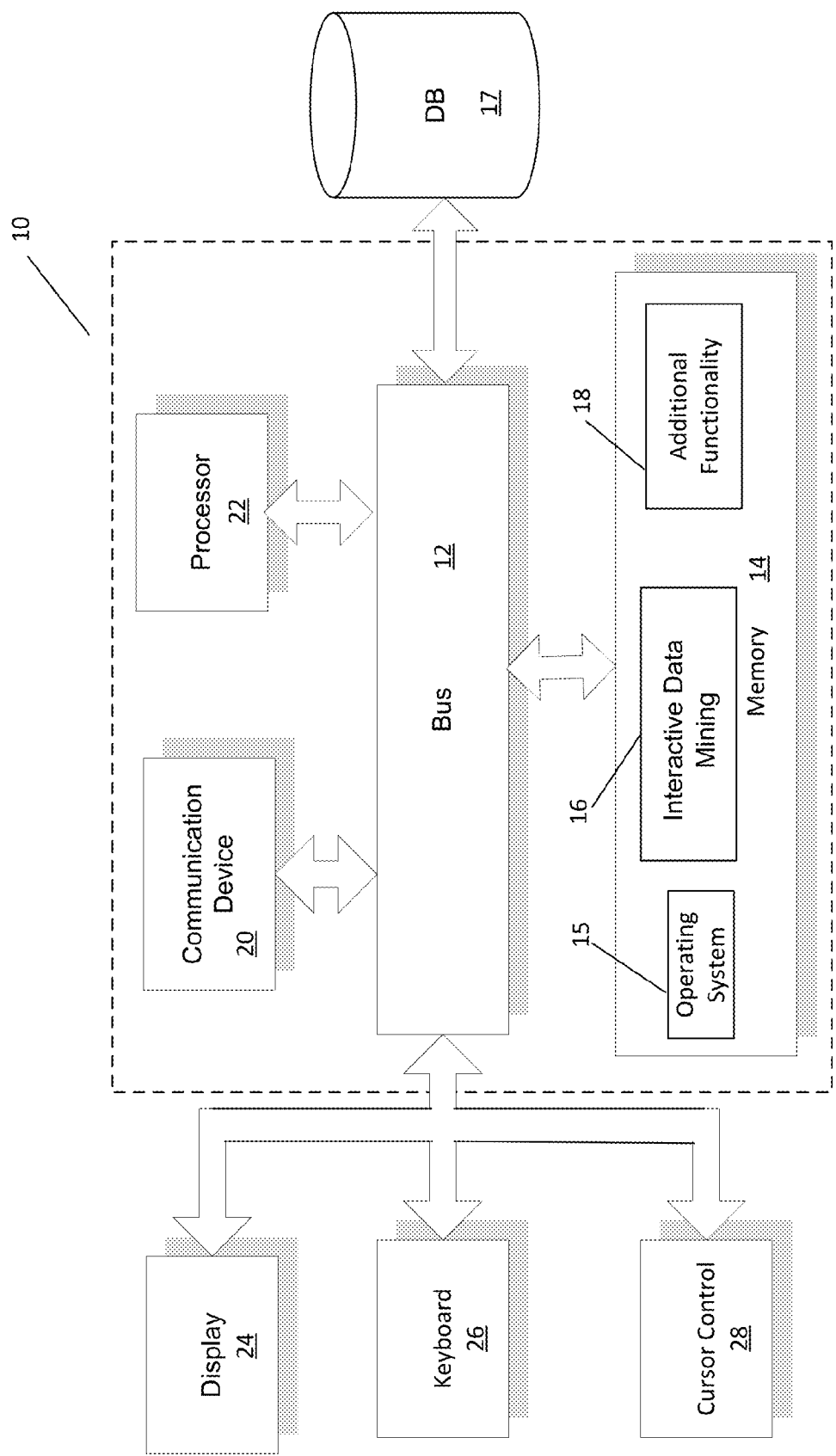
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an interactive data mining module 16 that provides interactive data mining, as disclosed in more detail below. System 10 can be part of a larger system, such as a database management system or an enterprise resource planning ("ERP") system. Therefore, system 10 will typically include one or more additional functional modules 18 to include the additional functionality. A database 17 is coupled to bus 12 to provide centralized storage for modules 16 and 18 and store one or more data sets to be mined, etc.

As discussed, one embodiment determines correlations between columns in a data set, and allows a user to interactively select values from a column in order to further refine the data. The data set should include two or more variables or data columns, and corresponding data for each variable. In order to illustrate embodiments of the invention, a known data set disclosed in Harrison et al., "Hedonic prices and the demand for clean air", *J. Environ. Economics & Management*, vol. 5, 81-102 (1978) (referred to as the "Boston 1978 data set") is utilized. The Boston 1978 data set is comprised of 17 variables or data columns recorded for each census tract in the metropolitan Boston area (506 total). Table 1 below lists the variables/columns as well as an explanation of the variables.

TABLE 1

Boston 1978 data columns

| | |
|---|---|
| TRACT | tract number |
| LON | approximate longitude |
| LAT | approximate latitude |
| CMEDV | median value of owner-occupied homes in $1000s |
| CRIM | per capita crime rate |
| ZN | portion of residential land zoned for lots over 25,000 sq. ft. |
| INDUS | proportion of non-retail business acres per town |
| CHAS | Charles River dummy variable (=1 if tract bounds river) |
| NOX | nitric oxides concentration (parts per 10 million) |
| RM | average number of rooms per dwelling |
| AGE | proportion of owner-occupied units built prior to 1940 |
| DIS | weighted distances to five Boston employment centers |
| RAD | index of accessibility to radial highways |
| TAX | property-tax rate per $10,000 |
| PTRATIO | pupil-teacher ratio by town |
| B | 1000(Bk − 0.63)², where Bk is the proportion of blacks |
| LSTAT | % lower economic status of the population |

Data mining of a data set such as the Boston 1978 data set can provide insights to a user (e.g., a recent transplant to the Boston area who is looking to buy a house). One embodiment determines characteristics of the data set of interest to the user by determining correlations between the numerical or label columns. In one embodiment, the known "Pearson correlation" is used to determine statistical relationships involving dependence between the columns.

The Pearson correlation can be expressed as follows: Given a series of n measurements of X and Y (i.e., two columns) written as x, and y, where i=1, 2, ..., n, a "sample correlation coefficient" can be used to estimate the Pearson correlation r between X and Y. The sample correlation coefficient is written as:

$$r_{xy} = \frac{\sum_{i=1}^{n}(x_i - \bar{x})(y_i - \bar{y})}{(n-1)s_x s_y} = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}},$$

where $\bar{x}$ and $\bar{y}$ are the sample means of X and Y, and $s_x$ and $s_y$ are the sample standard deviations of X and Y.

The Pearson correlation is +1 in the case of a perfect positive (increasing) linear relationship (correlation), −1 in the case of a perfect decreasing (negative) linear relationship (anticorrelation) and some value between −1 and 1 in all other cases, indicating the degree of linear dependence between the variables. As it approaches zero there is less of a relationship (closer to uncorrelated). The closer the coefficient is to either −1 or 1, the stronger the correlation between the variables.

For example, in embodiments where the data set is that of manufacturing and sales, a user might be interested in affecting a particular column that cannot be directly manipulated, such as profit. Embodiments using the Pearson correlation can demonstrate to the user which columns correlate (or anti-correlate) with the column of interest. For example, the number of vacation days, which can be directly influenced, is positively correlated with productivity, or the rate of machine X being introduced in the factories can be anti-correlated with the failure rate of the manufactured item. It is well known that correlation does not imply causality; however, such correlations can point to valuable insights. In the examples above, for instance, the insight may be suggesting that managers increase the number of vacation days and utilize machine X.

Other known methods for determining correlation between columns of data or labels can be used instead of the Pearson correlation. Examples include distance correlation, Brownian correlation, and Rank correlation coefficients such as Spearman's rank correlation coefficient and Kendall's rank correlation coefficient.

One embodiment allows a user to detect arbitrary insight of the data set, such as by finding answers to questions the user does not know how to ask. Embodiments determine $r(C_x, C_y)$ for every pair of columns of quantitative data. Using the Boston 1978 data set as an example, the top correlations are show in Table 2:

TABLE 2

Top correlations

| | | |
|---|---|---|
| DIS | NOX | −0.769 |
| INDUS | NOX | +0.764 |
| AGE | DIS | −0.748 |
| CMEDV | LSTAT | −0.741 |

The results of the correlations confirm that the air pollution ("NOX") is anti-correlated to the distance ("DIS") from the places of employment, which, in 1978, were likely to involve industrial production; that the prevalence of industry ("INDUS") in towns results in more air pollution; that the older towns ("AGE") are more centrally located; and that expensive houses ("CMEDV") are rarely afforded by poor people ("LSTAT"). Slightly further down the list is the anti-correlation between house prices and pupil-teacher ratio: r(CMEDV, PTRATIO)=−0.506, suggesting that expensive houses (high CMEDV) do correlate with good schools (low PTRATIO).

Embodiments further determine a correlation between a numerical (quantitative) column and a text/label (nominative) column, such as the name of each town in the Boston 1978 data set. Embodiments split each nominative column into as many columns as there are different values, as shown in Table 3 below. This creates a set of binary variables (is the given tract in Boston? Cambridge? Brookline?). The formula remains the same, reducing to the case of point-biserial correlations.

TABLE 3

Converting a nominative column into a series of binary (quantitative) columns

| Nominative column | Boston column | Cambridge column | Brookline column |
|---|---|---|---|
| Boston | 1 | 0 | 0 |
| Boston | 1 | 0 | 0 |
| Boston | 1 | 0 | 0 |
| Cambridge | 0 | 1 | 0 |
| Cambridge | 0 | 1 | 0 |
| Brookline | 0 | 0 | 1 |

Splitting the columns may cause a performance hit as there are now N columns instead of one. If an embodiment is determining all pairwise correlations, the penalty is multiplicative: two columns with three different values in each will make the computations nine times slower. However, the impact is linear if the correlation with one fixed column of interest is being determined. Further, embodiments are greatly simplified in the case of binary values, and parallelization and sampling can be applied.

In the example embodiment, after running the complete pairwise computations, a set of new correlations are generated, as shown in Table 4 below. Here, there is a strong correlation with the variable B, for the largely black neighborhood of Roxbury: r=−0.574 (the sign is negative since B decreases with the increase of black population). Other correlations offer immediately useful information to our potential user who is looking where in Boston to buy a house: Cambridge has high air pollution but (at least, in 1978) good schools; Brookline also has good schools; and Charlestown has a high crime rate.

TABLE 4

Top correlations for town names

| Boston Roxbury | B | −0.574 |
| Cambridge | PTRATIO | −0.436 |
| Cambridge | NOX | +0.417 |
| Brookline | PTRATIO | −0.393 |
| Boston Charlestown | CRIM | +0.326 |

Figure 2:
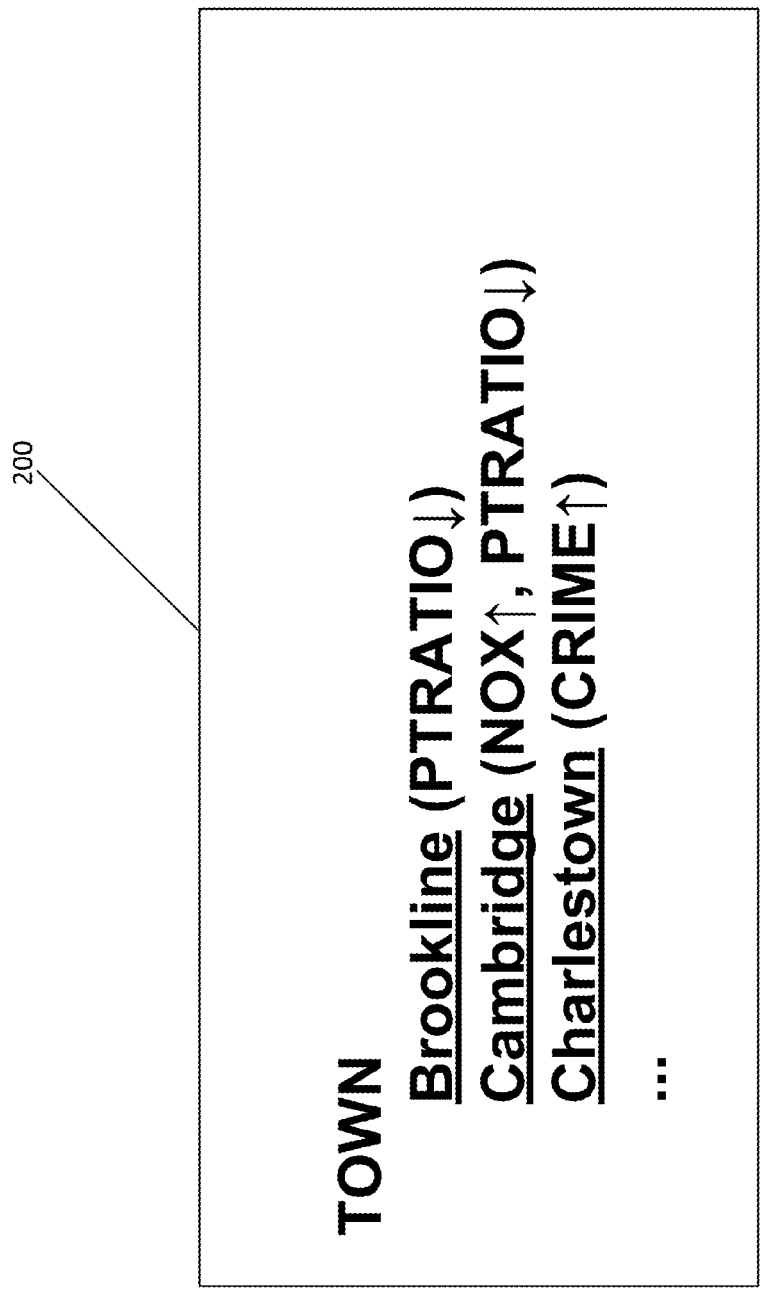
FIG. 2 is an example screenshot of a user interface in accordance with one embodiment of the present invention.

Embodiments provide the derived information in a user interface in a format similar to one used for guided navigation that provides a preview to a user in response to a possible refinement. FIG. 2 is an example screenshot of a user interface 200 in accordance with one embodiment. User interface 200 displays the top correlations from Table 4 above in the form of a selectable label and the correlated variable in parenthesis, along with an up arrow for positive correlation, and a down arrow for negative anti-correlation. The user can select a label in interface 200 in order to "drill down" or refine the data.

Therefore, as shown in FIG. 2, system 10 automatically generates a "preview" of each possible refined state in parentheses, deriving this preview entirely from the data's most salient features, requiring no human input, and performing relatively simple computations (i.e., correlations between columns). Further, the computations disclosed above that were performed on the entire data set are re-computed on the basis of the narrowed subset after a refinement is selected. This way, if the user decides to limit selection to towns with good schools (e.g., Brookline and Cambridge in 1978), the PTRATIO variable will correlate less strongly (being low for both towns), and another variable is likely to be selected as a highly-correlating feature for the subsequent refinement preview.

Additional or other data can be displayed in parenthesis of the interface in other embodiments as a preview. For example, in one embodiment the cardinality or number of data points for the label is displayed. The cardinality may be helpful for the user. For example, the number of houses for sale in each town may be displayed as a preview. Therefore, if Brookline only includes one home for sale, the user knows that selecting Brookline for further data mining or refinement may not be worthwhile because the underlying data is trivial.

Other embodiments present the correlated information to be refined to users in a different manner than as shown in FIG. 2. For example, refinements can be grouped according to their main (anti-)correlations, as opposed to the industry-standard grouping by their taxonomic categories; the refinements can be sorted in the order of decreasing correlation; or the user can be simply alerted to the top correlating pairs.

Figure 3:
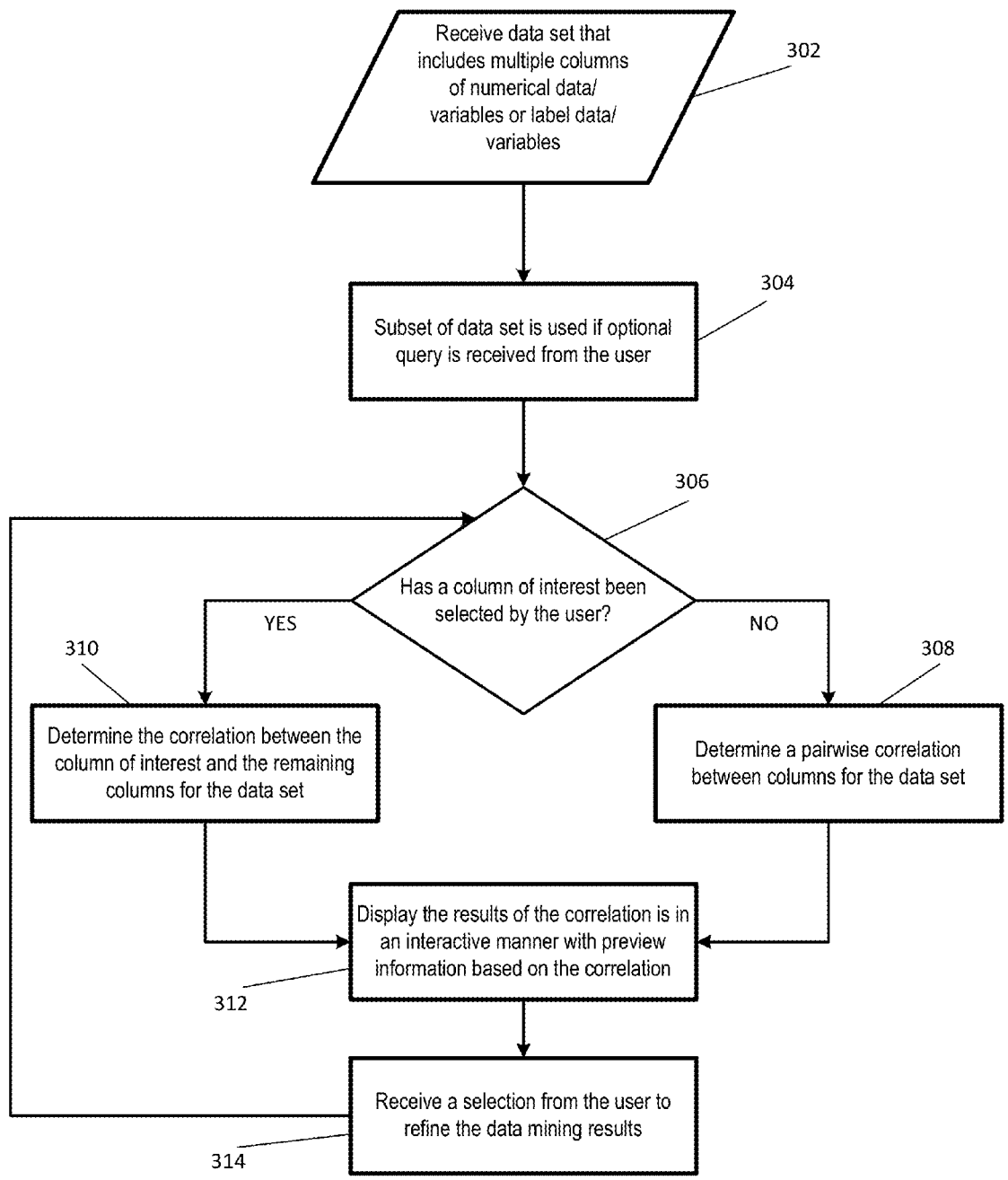
FIG. 3 is a flow diagram of the functionality of the interactive data mining module of FIG. 1 in accordance with one embodiment of the present invention.

FIG. 3 is a flow diagram of the functionality of the interactive data mining module 16 of FIG. 1 in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, the data set is received. The data set includes multiple columns of numerical data/variables or label data/variables. In one embodiment, a determination is made of columns that can be eliminated from the data mining process in order to improve efficiency. For example, a street name might not be a useful variable because the data mining will not drill down to that level of detail.

At 304, an optional query is received from the user in which case a subset of the data set is used for the data mining. Otherwise, the entire data set is data "mined" (i.e., top level data). Examples of a query for the Boston 1978 data set described above include: "All records for which CITY=Boston"; "All records for which CITY=Cambridge OR CITY=Brookline"; and "All records for which DISTANCE<10 AND NOX<AVERAGE(NOX)."

At 306, it is determined if a column of interest has been selected by the user. For example, the user may select a "Profit" column or "Schools" column if the user at this initial stage of the data mining has a particular interest in a column within the data set.

If a column of interest has been selected, at 310 the correlation/anti-correlation between the column of interest and the remaining columns of the data set (or subset from 304) is determined to suggest which columns correlate to the column of interest. If the column of interest has not been selected, at 308 a pair-wise correlation/anti-correlation between all columns of the data set (or subset from 304) is determined to suggest highly correlated/anti-correlated pairs of columns to the user. In one embodiment, the correlation is performed using the Pearson correlation.

At 312, the result of the correlation is displayed in an interactive manner with preview information based on the correlation. For example, the ten highest correlated/anti-correlated pair of columns can be displayed in which a label for each column is selectable, as shown in FIG. 2. In one embodiment, the labels that are part of the highest correlated pair are displayed, and the corresponding data column is displayed in parenthesis as a preview as in FIG. 2. In an embodiment where a column of interest was selected, as determined at 306, one of the columns of each displayed pair would be the column of interest.

At 314, a selection from the user from the display of 312 is received to refine the data mining results in an iterative manner, such as by selecting a value from a column to iterate to a different result set in the pair-wise correlation embodiment. For example, in response to the display of FIG. 2, if the user is interested in living in a town with good schools, the "Brookline" value may be selected because the preview indicates that it is highly correlated with good schools. As a result of the selection, a new display will be generated based on the rows that correspond to the value of Brookline. The new display may be individual tracts within Brookline, and the user can then select one of the tracts based on the new correlation preview information as the functionality continues at 306. In addition to a narrowing refinement as previously described, the refinement can also broaden the data set or be a lateral refinement.

After 314, the functionality can then continue at 306 so that the data can be continually mined in an iterative manner.

Embodiments based on the functionality of FIG. 3 can provide useful data mining in a variety of ways. For one, it enables a user to select one or more columns of interest, and determine correlation or anti-correlation with other columns, and cause the system to further drill down based on selected values. Further, it enables a user to easily derive information from a large data set. For example, the results of the correlation may tell the user that the inner city tracts are correlated with bad air. Further, embodiments may correlate a numerical column with a label column to determine which labels correlate with salient/important data for the user.

Further, embodiments can be used in other applications such as e-commerce. For example, embodiments can distill the list of information-free brand names into relevant facts (e.g., brand X is strongly correlated with cheap products, while brand Y has high user ratings).

As disclosed, embodiments receive a data set, and determine correlations between columns. The highest correlations and anti-correlations are then displayed in an interactive manner in the form of label data with preview information. The user can then select columns of interest and the correlation computation can be repeated until the data has been mined for information of interest to the user.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer readable medium having instructions stored thereon that, when executed by a processor, cause the processor to perform data mining, the data mining comprising:
   receiving a data set, the data set comprising a plurality of columns of data;
   determining pair-wise correlations between pairs of columns of data of the data set, the determining comprising determining a numerical coefficient for each pair of columns;
   displaying an interactive listing in a user interface of a subset of the plurality of pairs of columns based on the correlations, wherein the listing comprises preview information for each pair, the preview information based on the correlations;
   wherein the subset is based on ranking the correlations based on the numerical coefficients and displaying highest correlations and/or highest anti-correlations;
   receiving a selection of a value from the interactive listing from a user; and
   refining the data set in response to the selection, wherein the refining comprises determining additional pair-wise correlations based on the selection of the value as a column of interest.

2. The computer readable medium of claim 1, further comprising receiving a selection of a first column of interest from the user before determining the pair-wise correlations, wherein the pair-wise correlations comprise a correlation between the first column of interest and each of the remaining columns of data.

3. The computer readable medium of claim 1, wherein one of the columns is a nominative column, further comprising splitting the nominative column into a column for each different value of the nominative column.

4. The computer readable medium of claim 1, wherein the columns of data comprise label data columns and numerical data columns.

5. The computer readable medium of claim 4, wherein each numerical data column comprises a corresponding variable.

6. The computer readable medium of claim 5, wherein the interactive listing comprises one or more label data, and for each label data a corresponding variable of a correlated numerical data variable, and wherein the selected value is a first label data.

7. The computer readable medium of claim 1, wherein the listing comprises at least one of the highest correlated or anti-correlated pairs of columns.

8. A method of data mining, method comprising:
   receiving a data set, the data set comprising a plurality of columns of data;
   determining pair-wise correlations between pairs of columns of data of the data set, the determining comprising determining a numerical coefficient for each pair of columns;
   displaying an interactive listing in a user interface of a subset of the plurality of pairs of columns based on the correlations, wherein the listing comprises preview information for each pair, the preview information based on the correlations;
   wherein the subset is based on ranking the correlations based on the numerical coefficients and displaying highest correlations and/or highest anti-correlations;
   receiving a selection of a value of one of the displayed columns from the interactive listing; and
   refining the data set in response to the selection, wherein the refining comprises determining additional pair-wise correlations based on the selection of the value as a column of interest.

9. The method of claim 8, further comprising receiving a selection of a first column of interest before determining the pair-wise correlations, wherein the pair-wise correlations comprise a correlation between the first column of interest and each of the remaining columns of data.

10. The method of claim 8, wherein one of the columns is a nominative column, further comprising splitting the nominative column into a column for each different value of the nominative column.

11. The method of claim 8, wherein the columns of data comprise label data columns and numerical data columns.

12. The method of claim 11, wherein each numerical data column comprises a corresponding variable.

13. The method of claim 12, wherein the interactive listing comprises one or more label data, and for each label data a corresponding variable of a correlated numerical data variable, and wherein the selected value is a first label data.

14. The method of claim 8, wherein the listing comprises at least one of the highest correlated or anti-correlated pairs of columns.

15. A data mining system for a data set comprising a plurality of columns of data, the system comprising:
   a correlator that determines pair-wise correlations between columns of data of the data set, the determining comprising determining a numerical coefficient for each pair of columns;
   a display generator that displays an interactive listing in a user interface of a subset of the plurality of pairs of columns based on the correlations of the correlator, wherein the listing comprises preview information for each pair, the preview information based on the correlations;

wherein the subset is based on ranking the correlations based on the numerical coefficients and displaying highest correlations and/or highest anti-correlations; and a data set refiner that receives a selection of a value of one of the displayed columns from the interactive listing from a user and refines the data set in response to the selection, wherein the refining comprises determining additional pair-wise correlations based on the selection of the value as a column of interest.

16. The system of claim 15, wherein the correlator receives a selection of a first column of interest from the user before determining the pair-wise correlations, wherein the pair-wise correlations comprise a correlation between the first column of interest and each of the remaining columns of data.

17. The system of claim 15, wherein one of the columns is a nominative column, further comprising splitting the nominative column into a column for each different value of the nominative column.

18. The system of claim 15, comprises at least one of the highest correlated or anti-correlated pairs of columns.

19. The system of claim 15, wherein the columns of data comprise label data columns and numerical data columns.

20. The system of claim 19, wherein each numerical data column comprises a corresponding variable, the interactive listing comprises one or more label data, and for each label data a corresponding variable of a correlated numerical data variable, and wherein the selected value is a first label data.

* * * * *